(12) United States Patent
Godard et al.

(10) Patent No.: US 10,337,382 B2
(45) Date of Patent: Jul. 2, 2019

(54) HEAT RECOVERY DEVICE AND EXHAUST LINE FITTED WITH SUCH DEVICE

(71) Applicant: Faurecia Systemes D'Echappement, Nanterre (FR)

(72) Inventors: Yannick Godard, Blussans (FR); Julien Cabillic, Hericourt (FR)

(73) Assignee: Faurecia Systems D'Echappement (FR)

( * ) Notice: Subject to any disclaimer, the term of this patent is extended or adjusted under 35 U.S.C. 154(b) by 0 days.

(21) Appl. No.: 15/540,345

(22) PCT Filed: Dec. 30, 2015

(86) PCT No.: PCT/EP2015/081410
§ 371 (c)(1),
(2) Date: Jun. 28, 2017

(87) PCT Pub. No.: WO2016/107899
PCT Pub. Date: Jul. 7, 2016

(65) Prior Publication Data
US 2018/0003097 A1    Jan. 4, 2018

(30) Foreign Application Priority Data
Dec. 31, 2014 (FR) .................................. 14 63481

(51) Int. Cl.
*F01N 5/02* (2006.01)

(52) U.S. Cl.
CPC ............ *F01N 5/02* (2013.01); *F01N 2240/02* (2013.01); *F01N 2240/20* (2013.01);
(Continued)

(58) Field of Classification Search
USPC ......... 60/274, 287, 288, 289, 292, 293, 298, 60/320, 321, 324
See application file for complete search history.

(56) References Cited

U.S. PATENT DOCUMENTS 8,424,296 B2 * 4/2013 Burgers ................ F01N 3/2889
60/298
8,522,537 B2 * 9/2013 Lee ........................ F01M 5/001
60/298
(Continued)

FOREIGN PATENT DOCUMENTS

DE    102012104396    11/2013
EP    2762695    8/2014
(Continued)

OTHER PUBLICATIONS

Search Report from priority application, FR 1463481.

*Primary Examiner* — Binh Q Tran
(74) *Attorney, Agent, or Firm* — Carlson, Gaskey & Olds, P.C.

(57) ABSTRACT

A heat recovery device comprises a valve body inwardly defining a direct flow path for exhaust gases from an inlet to an outlet, a heat exchanger comprising a flow passage for the exhaust gases emerging in an inlet zone of the valve body, and a gate positioned in the valve body. The heat recovery device comprises a guide wall positioned in the direct flow path at the inlet zone, arranged to guide the exhaust gases from the inlet toward the cutoff section away from the inlet zone when the gate frees the direct flow path, and delimiting at least one orifice to allow the exhaust gases to go to the inlet zone when the gate closes off the direct flow path.

21 Claims, 2 Drawing Sheets

(52) U.S. Cl.
CPC ...... *F01N 2260/08* (2013.01); *F01N 2410/00* (2013.01); *F01N 2470/02* (2013.01); *Y02T 10/16* (2013.01)

(56) References Cited

U.S. PATENT DOCUMENTS

| | | | |
|---|---|---|---|
| 9,863,304 B2* | 1/2018 | Shinpo | ................... F01P 11/10 |
| 9,920,678 B2* | 3/2018 | Dominguez | ............ F01N 3/043 |
| 10,041,389 B2* | 8/2018 | Weidner | .............. F16K 27/0218 |
| 2011/0131961 A1 | 6/2011 | Lee | |
| 2012/0144814 A1 | 6/2012 | Won | |
| 2013/0213606 A1 | 8/2013 | Greber | |
| 2014/0251579 A1* | 9/2014 | Sloss | ........................ F01N 5/02 165/96 |

FOREIGN PATENT DOCUMENTS

| | | |
|---|---|---|
| EP | 2803843 | 11/2014 |
| FR | 2989998 | 11/2013 |
| JP | 2009030569 A | 2/2009 |

\* cited by examiner

HEAT RECOVERY DEVICE AND EXHAUST LINE FITTED WITH SUCH DEVICE

CROSS-REFERENCE TO RELATED APPLICATIONS

This application is the U.S. national phase of PCT/EP2015/081410, filed Dec. 30, 2015, which claims priority to FR 14 63481, filed Dec. 31, 2014.

TECHNICAL FIELD

The invention generally relates to heat recovery devices for exhaust lines.

BACKGROUND

In one example configuration, a heat recovery device for an exhaust line includes a valve body having at least one exhaust gas inlet and at least one exhaust gas outlet, the valve body inwardly defining a direct flow path for the exhaust gases from the inlet to the outlet. The device also includes a heat exchanger to exchange heat between exhaust gases and a heat transfer fluid. The heat exchanger includes a flow path for the exhaust gases and a flow path for the heat transfer fluid, the with flow path for the exhaust gases having upstream and downstream ends respectively emerging in inlet and outlet zones of the valve body, which are respectively situated relatively closer to the inlet and relatively closer to the outlet along the direct flow path. A shutter is arranged in the valve body and is movable relative to the valve body at least between a heat exchange position, in which the shutter closes off a cutoff section of the direct flow path and forces the exhaust gases to flow from the inlet toward the outlet through the heat exchanger along the exhaust gas flow path, and a short-circuit position, in which the shutter frees said cutoff section of the direct flow path and closes off the outlet zone. The shutter thus forces the exhaust gases to flow from the inlet toward the outlet along the direct flow path, the cutoff section being situated between the inlet zone and the outlet zone along the direct flow path.

When the shutter is in the short-circuit position, the exchanger is inactive. The exhaust gases flow from the inlet to the outlet of the valve body along the direct flow path.

However, residual heat transfers are observed from the exhaust gas to the heat transfer fluid. These residual heat transfers are also called parasitic losses.

In this context, the invention aims to propose a heat recovery device in which parasitic losses are reduced.

SUMMARY

To that end, the invention relates to a heat recovery device of the aforementioned type. In one example, the heat recovery device comprises a guide wall arranged in the direct flow path in front of the inlet zone and arranged to guide the exhaust gases from the inlet toward the cutoff section away from the inlet zone when the shutter is in the short-circuit position. The guide wall further defines at least one opening to allow the exhaust gases to flow to the inlet zone when the shutter is in the heat exchange position.

Because the guide wall deflects the exhaust gases away from the inlet zone of the exchanger when the shutter is in the short-circuit position, the guide wall reduces the quantity of exhaust gas penetrating the heat exchanger through the inlet zone.

This quantity is significant without the guide wall. It contributes to transferring heat to the heat transfer fluid.

The heat recovery device may also have one or more of the features below, considered individually or according to all technically possible combinations. The guide wall is a tube, inwardly defining a conduit for the exhaust gases, the conduit extending from an upstream opening situated upstream from the inlet zone to a downstream opening situated downstream from the inlet zone. In the cutoff section, the device comprises at least one obstacle able to hinder the flow of the exhaust gases, and a downstream end part of the guide wall is arranged to deflect the exhaust gases away from said obstacle. The obstacle comprises a frame defining a sealing face for the shutter in the heat exchange position. The frame has an inner edge defining a central opening for the passage of the exhaust gases, and a downstream end part of the guide wall is connected to the inner edge. The guide wall is defined in the upstream direction by an upstream edge sealably connected to an inner surface of the direct flow path. The guide wall is separated from the valve body by a gas layer, at least in front of the inlet zone, the direct flow path being at a first pressure at the outlet zone when the shutter is in the short-circuit position, and the gas layer being at a second pressure lower than the first pressure when the shutter is in the short-circuit position. The heat exchanger includes an enclosure inwardly defining the heat transfer fluid flow passage and pressed against the valve body, the enclosure having at least one opening closed by a wall of the valve body in which the inlet zone is arranged. The shutter bears a seal bearing against the valve body in the short-circuit position, wherein the seal is made from a metal knit. The direct flow path offers, along the guide wall, a first passage section for the exhaust gases, the flow path offering, along the outlet zone, a second passage section for the exhaust gases, larger than the first passage section.

According to a second aspect, the invention pertains to a vehicle exhaust line comprising a heat recovery device having the above features.

BRIEF DESCRIPTION OF THE DRAWINGS

Other features and advantages of the invention will emerge from the following detailed description, provided for information and non-limitingly, in reference to the appended figures, in which.

DETAILED DESCRIPTION

Figure 1:
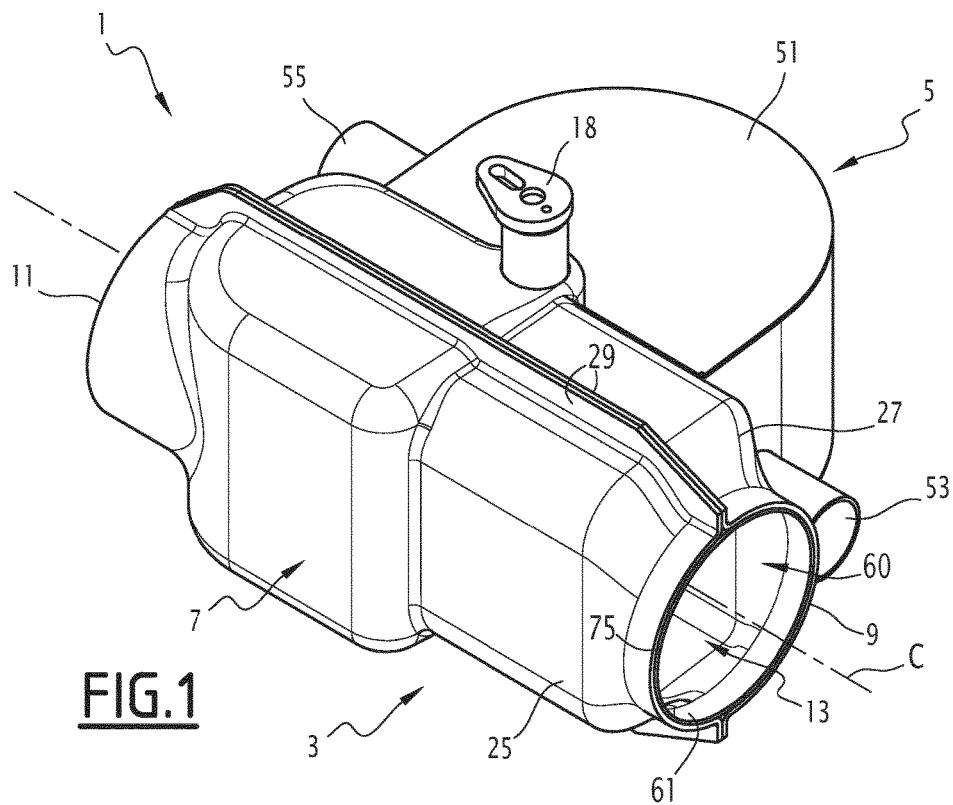
FIG. 1 is a perspective view of a heat transfer device according to the invention.

The heat recovery device 1 shown in FIG. 1 is intended to be inserted in a vehicle exhaust line. This vehicle is typically a motor vehicle, for example a car or truck.

This device is intended to recover part of the thermal energy from the exhaust gases, to transfer it, for example, to the engine coolant line, or to the heating circuit of the passenger compartment.

The device 1 includes a valve 3 and a heat exchanger 5.

The valve 3 includes: a valve body 7, having an exhaust gas inlet 9 and an exhaust gas outlet 11, the valve body 7 inwardly defining a direct flow path 13 for the exhaust gases from the inlet 9 to the outlet 11; a shutter 15 arranged inside the valve body 7, and movable relative to the valve body 7 at least between a heat exchange position (FIG. 3), in which the shutter closes off a cutoff section of the direct flow path 13 and thus forces the exhaust gases to flow from the inlet 9 toward the outlet 11 through the heat exchanger 5, and a short-circuit position (FIG. 2), in which the shutter 15 frees said cutoff section of the direct flow path 13 and forces the exhaust gases to flow from the inlet 9 toward the outlet 11 along the direct flow path 13.

The valve body 7 has a central axis C, which is also the central axis of the direct flow path 13.

Figure 3:
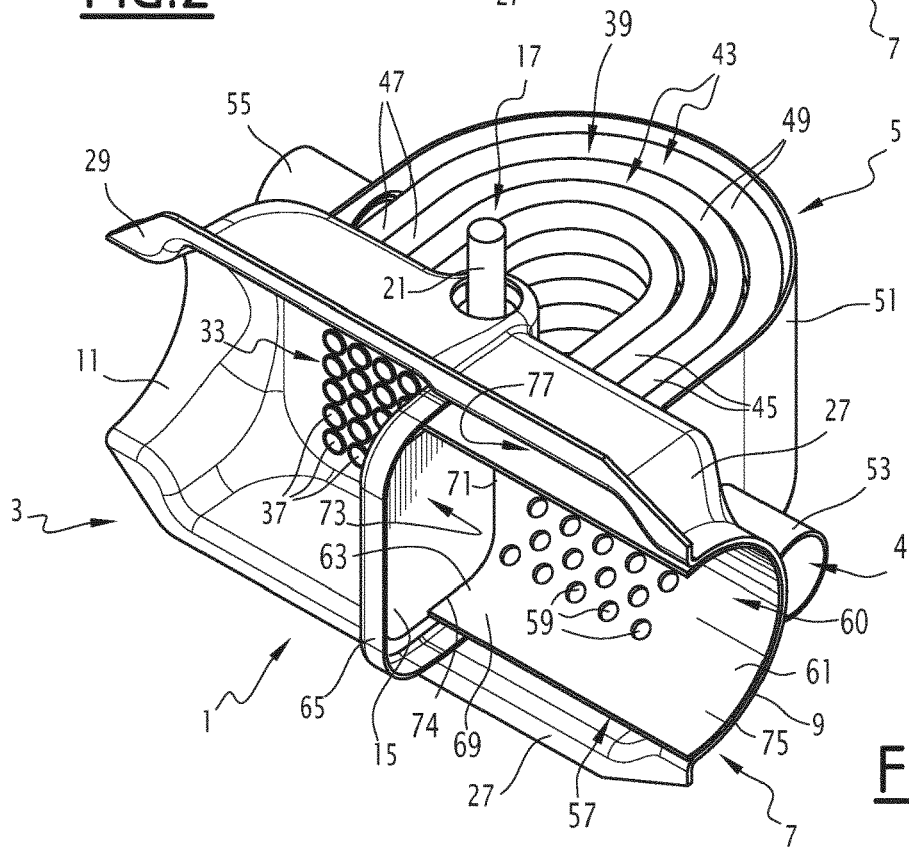
FIG. 3 is a view similar to that of FIG. 2, half of the guide wall being shown, the shutter being in the heat exchange position.

The shutter 15 is rotatable relative to the valve body between its heat exchange and short-circuit positions, around an axis 17 defined by shaft 21, visible in FIG. 3. The shutter 15 is secured to the shaft 21.

The shutter 15 is, for example, moved by a crank 18.

In the illustrated example, the valve body 7 includes two valve half-shells 25, 27 alongside one another by respective edges 29. The edges 29 are alongside and against one another along a contact plane substantially parallel to the axis 17. The inlet 9 and the outlet 11 are each defined for one half by the half-shell 25, and for the other half by the half-shell 27.

The shaft 21 is mounted on the half-shell 27.

Alternatively, the valve body 7 is not made up of two half-shells, but is formed in any other appropriate manner.

Figure 2:
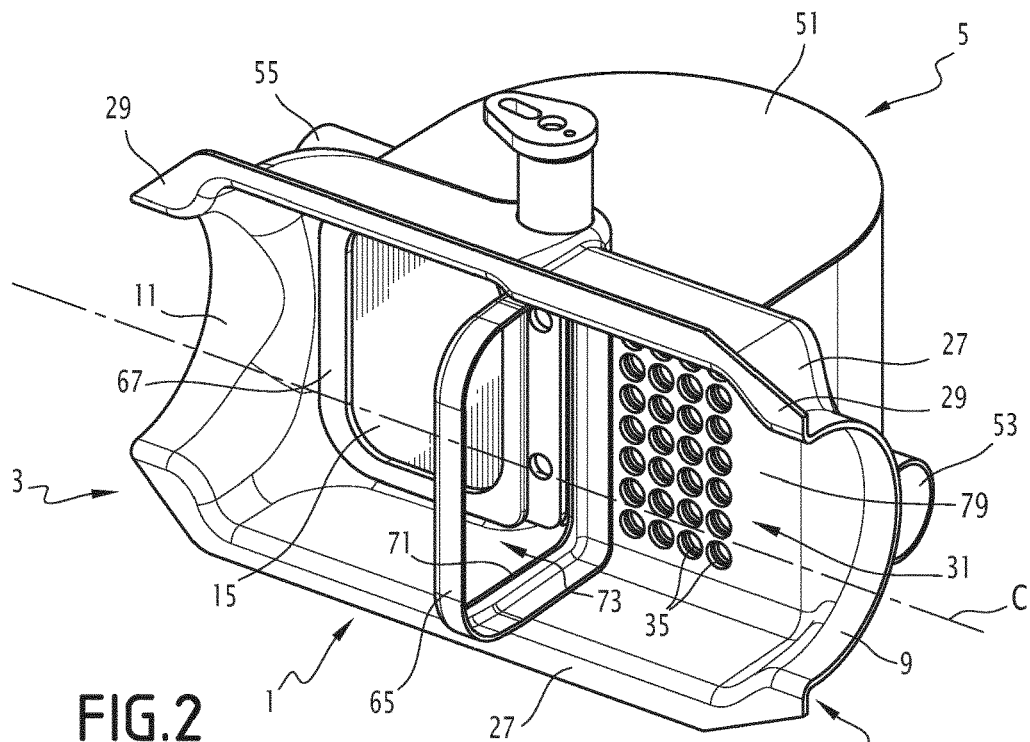
FIG. 2 is a perspective view similar to that of FIG. 1, one of the two half-shells making up the valve body and the guide wall not being shown, so as to leave the inner structure of the valve body visible, the shutter being in the short-circuit position.

The valve body 7 also includes an inlet zone 31 (FIG. 2) by which the exhaust gases can flow from the direct flow path 13 into the heat exchanger 5. It also includes an outlet zone 33 (FIG. 3) by which the exhaust gases coming from the heat exchanger 5 return into the direct flow path 13. As shown in FIGS. 2 and 3, the inlet zone 31 includes a plurality of inlet holes 35 and the outlet zone 33 includes a plurality of outlet holes 37.

The inlet zone 31 is situated, along the direct flow path 13, between the inlet 9 and the cutoff section. The outlet zone 33 is situated, along the direct flow path 13, between the cutoff section and the outlet 11.

The heat exchanger 5 is provided so that the exhaust gases cede part of their heat energy to a heat transfer fluid. It therefore includes an exhaust gas flow passage 39, and a heat transfer fluid flow passage 41. The exhaust gases traveling in the flow passage 39 are in thermal contact with the heat transfer fluid traveling in the flow passage 41.

The exhaust gas flow passage 39 has upstream and downstream ends respectively emerging in the inlet and outlet zones 31, 33 of the valve body 7.

In the illustrated example embodiment, the heat exchanger 5 includes a plurality of tubes 43, inside which the exhaust gases flow. The tubes 43 therefore together, inwardly, define the exhaust gas flow passage 39. Each tube 43 is connected by one end to one of the inlet openings 35, and by its opposite end to one of the outlet openings 37.

In the example illustrated in the figures, the tubes are each U-shaped, and each have an upstream branch 45 connected to one of the inlet openings 35, a downstream branch 47 connected to one of the outlet openings 37, and an arch 49 connecting the upstream and downstream branches 45, 47 to one another. The upstream 45 and downstream 47 branches here are substantially parallel to one another and substantially perpendicular to the inlet 31 and outlet 33 zones.

The heat exchanger 5 further includes an enclosure 51 inwardly defining a volume in which the tubes 43 are housed. The enclosure 51 has an inlet 53 for the heat transfer fluid, and an outlet 55 for the heat transfer fluid. Thus, the inner volume of the enclosure 51 inwardly defines the heat transfer fluid flow path 41.

Alternatively, the heat exchanger 5 may take any other form, as long as the upstream and downstream ends of the exhaust gas flow path emerge in the direct flow path 13 through the inlet zone 31 and the outlet zone 33, respectively, of the valve body 7. The heat exchanger 5 may, for example, be a tube exchanger, the tubes of which are not U-shaped, or a plate exchanger, or any other type of exchanger.

The heat exchange position of the shutter is shown in FIG. 3. The shutter 15 closes off the direct flow path 13 at the cutoff section. The exhaust gases are thus forced to flow from the inlet 9 to the inlet zone 31, from which they penetrate the heat exchanger 5, then travel through the flow path 39 up to the outlet zone 33. At the outlet zone 33, they return inside the direct flow path 13, then flow to the outlet 11.

The short-circuit position of the shutter 15 is illustrated in FIG. 2. In this position, the shutter 15 frees the cutoff section of the direct flow path, and closes off the outlet zone 33. The exhaust gases are thus forced to flow from the inlet 9 to the outlet 11 along the direct flow path 13.

According to the invention, the heat recovery device 1 comprises a guide wall 57, positioned in the direct flow path 13 in front of the inlet zone 31. The guide wall 57 is arranged to guide the exhaust gases from the inlet 9 toward the cutoff section away from the inlet zone 31 when the shutter 15 is in the short-circuit position.

As shown in particular in FIG. 2, the inlet zone 31 has a limited size in light of the total surface area of the valve body 7. It typically extends circumferentially over at least half of the perimeter of the valve body 7, preferably over at least one third of the perimeter of the valve body 7. Along the central axis C of the valve body 7, it extends over less than half of the length of the valve body 7, preferably over less than one third of the length of the valve body 7.

The outlet zone 33 has substantially the same size as the inlet zone 31.

The guide wall 57 is situated in front of the inlet zone 31 in that it is inserted radially between the central axis C of the valve body and the inlet zone 31. The guide wall 57 is arranged to guide the exhaust gases away from the inlet zone 31, in that the flow lines which, in the absence of guide walls, would pass near the inlet zone are deflected for the most part and pass away from the inlet zone 31. Likewise, the turbulence in the flow is reduced, and consequently, the parasitic gas flow reaching the inlet zone 31 is also reduced.

Furthermore, the guide wall 57 defines at least one opening 59, to allow the exhaust gases to pass up to the inlet zone 31 when the shutter is in the heat exchange position, as shown in FIG. 3.

Thus, in the heat exchange position of the shutter 15, the exhaust gases flow from the inlet 9 through the opening(s) 59 up to the inlet zone 31, then through the flow passage 39 of the heat exchanger 5.

Typically, the openings 59 are pierced in the guide wall 57. According to one non-preferred alternative, they are arranged between an edge of the guide wall 57 and the valve body 7.

According to one particularly advantageous embodiment, the guide wall 57 is a tube, inwardly defining a conduit 60 for the exhaust gases, the conduit extending from an upstream opening 61 situated upstream from the inlet zone 31 to a downstream opening 63 situated downstream from the inlet zone 31. Considered perpendicular to the central axis C of the valve body 7, the tube has a closed section. It typically has a circular, or rectangular, or oval section, or any other section shape.

Thus, the exhaust gases flow inside the conduit 60 and are deflected away from the inlet zone 31.

The guide plate is typically made from steel. It for example has a thickness smaller than 1.5 mm, so as to limit the thermal inertia of the system.

Alternatively, the guide wall 57, considered in section perpendicular to the central axis, does not have a closed contour. It is open on one side, typically on a side opposite the inlet zone 31 relative to the central axis C.

As shown in FIG. 2 and FIG. 3, the heat recovery device 1 includes a frame 65 positioned in the cutoff section. This frame 65 defines a sealing face 67 (FIG. 4) against which the shutter 15 bears in the heat exchange position.

The frame 65 constitutes a geometric singularity capable of hindering the flow of the exhaust gases when the shutter 15 is in the short-circuit position. More specifically, without the guide wall 57, the frame 65 will generate, within the exhaust gas flow, recirculation that is partially responsible for parasitic losses, in addition to an increase in the back pressure. This recirculation drives some of the exhaust gases to the inlet zone 31, then to the inside of the heat exchanger 5.

The device may include other obstacles, in the cutoff section or at any point situated between the inlet zone 31 and the outlet zone 33, for example the axis 17 of the shutter or other parts or reliefs formed in the valve body 7.

According to one particularly advantageous aspect of the invention, a downstream end part 69 of the guide wall 57 is arranged to deflect the exhaust gases away from the obstacle (s).

Thus, the exhaust gas stream no longer forms recirculation contributing to steering part of the exhaust gases toward the inlet zone 31.

In the illustrated example, the frame 65 has an inner edge 71, defining a central opening 73 for the passage of the exhaust gases. The sealing face 67 surrounds the central opening 73.

The downstream end part 69 of the guide wall 57 is connected, preferably sealably, to the inner edge 71.

Typically, the downstream end part 69 is connected to the inner edge over the entire periphery of the opening 73.

Typically, the downstream end part 69 ends with a downstream edge 74 that is placed against the peripheral edge 71 and is welded thereto.

When the guide wall 57 does not have a closed contour, the downstream end part 69 is only connected to a portion of the inner edge 71, typically the portion turned toward the inlet zone 31.

Alternatively, play exists between the guide wall 57 and the frame 65, more specifically between the downstream end part 69 and the inner frame edge 71.

In the example shown in FIG. 3, the guide wall 57 is defined in the upstream direction by an upstream edge 75, sealably connected to an inner surface of the direct flow path 13.

The exhaust gases thus do not infiltrate between the guide wall 57 and the valve body 7, and thus do not circulate up to the inlet zone 31.

The upstream edge 75 typically defines the upstream opening 61 of the conduit. Furthermore, in the illustrated example, the downstream opening 63 coincides with the central opening 73 of the frame.

Typically, the upstream edge 75 has a closed contour, and is connected to the inner surface of the direct flow path 13 over the entire periphery thereof. It is for example placed to coincide with the exhaust gas inlet 9, or slightly offset toward the inside of the flow path relative to the inlet 9. For example, it is welded on the valve body 7 sealably.

Figure 4:
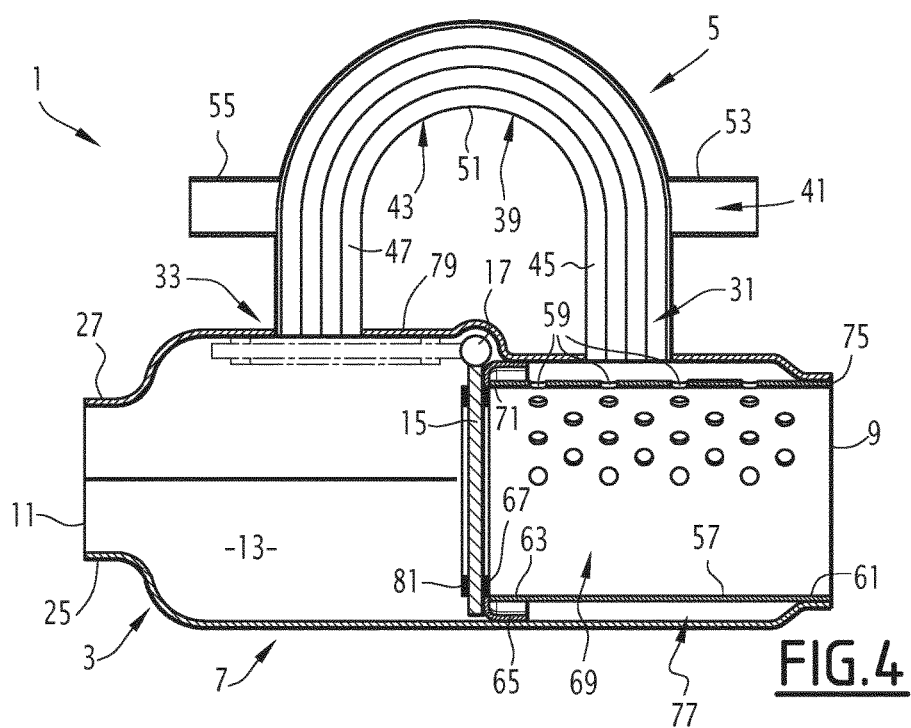
FIG. 4 is a sectional top view of the heat recovery device of FIGS. 1 to 3, the shutter being in the heat exchange position, a single heat exchange tube being shown.

As shown in FIGS. 3 and 4, the guide wall 57 is separated from the valve body 7 by a gas layer 77, at least in front of the inlet zone 31. In other words, there is a layer of gas between the guide wall 57 and the valve body 7. Preferably, the gas layer 77 extends over the entire periphery of the guide wall 57, when the guide wall is a tube. The gas layer typically has a thickness greater than or equal to 2 mm.

This has the advantage of reducing heat transfers from the exhaust gases to the valve body 7.

This is particularly advantageous in the configuration of the heat exchanger 5 shown in FIGS. 2 and 3, i.e., when the latter is pressed against the wall 79 of the valve body. The inlet zone 31 and the outlet zone 33 are zones of the wall 79.

For example, the enclosure 51 has an opening, this opening being closed by the wall 79. The opposite ends of the tubes 43 traverse the opening.

In this case, reducing the heat transfers from the exhaust gases toward the wall 79 contributes to limiting the parasitic losses very effectively, in particular because the heat transfer fluid is in contact with the wall 79.

The invention is particularly advantageous when the shutter bears a metal knit seal 81, bearing against the valve body 7 in the short-circuit position. The seal 81 bears against a sealing face arranged on the valve body 7, around the outlet zone 33. The seal 81 makes it possible to damp the vibrations created in the shutter 15 by the flow of the exhaust gases. These vibrations are transferred only slightly or not at all to the valve body 7. This in particular contribute to reducing the noise generated by the heat recovery device 1.

Furthermore, the metal knit seal 81 provides sealing between the shutter 15 and the valve body 7. However, this sealing is not perfect, which contributes to the flow of the exhaust gases through the heat exchanger in the short-circuit position of the shutter, without the guide wall 57.

With the guide wall 57, in the short-circuit position of the shutter 15, the direct flow path 13 is at a first pressure at the outlet zone 33 of the valve body. The gas layer 77 is a second pressure lower than the first pressure. Thus, a flow of the exhaust gases is surprisingly observed not from the gas layer 77 to the outlet zone 33, then the outlet 11, but conversely, from the outlet zone 33 to the gas layer 77 to the heat exchanger, and more specifically, through the flow path 39. This flow, by mass, is much lower than the flow occurring in the opposite direction without the guide wall 57. It is, for example, 4 times lower than the flow in the opposite direction without the wall 57.

Alternatively, the device includes a sealing member between the shutter and the valve body that is different from a metal knit seal. This member is of any suitable type.

Irrespective of the level of sealing procured by the sealing member, the existence of a pressure difference between the gas layer 77 and the outlet zone 33 contributes to preventing the fluid exhaust gases along the flow path 39 of the heat exchanger 5, from the inlet zone 31 to the outlet zone 33.

It should be noted that the direct flow path 13 offers, along the guide wall 57, a first passage section for the exhaust gases. The flow path 13, along the outlet zone 33, offers a second passage section for the exhaust gases, larger than the first passage section.

As a result, the flow speed of the exhaust gases is higher along the guide wall 57 than along the outlet zone 33, which contributes to creating an overpressure at the outlet 11.

In the illustrated example, the first passage section is defined by the guide wall 57, which has a tubular shape with a closed section. When the guide wall 57 does not have a closed section, the first passage section is defined between the guide wall 57 and the valve body 7.

It should also be noted that, in particular when the device includes an obstacle in the cutoff section, the guide wall makes it possible to reduce pressure losses for the exhaust gases flowing along the direct flow path.

The number and surface area of the openings 59 are chosen so that the guide wall 57 has only a small impact on the operation of the heat exchanger when the shutter is in the heat exchange position. In practice, the openings 59 are gathered in the zone of the guide wall situated in front of the inlet zone 31. Alternatively, there are other openings 59, in other zones of the guide wall 57.

The guide wall 57 does not increase the pressure losses for the exhaust gases significantly, in the heat exchange position of the shutter 15.

Furthermore, because a gas layer exists between the guide wall and the valve body 7, this valve body is thermally isolated from the exhaust gases by the gas layer. The valve body therefore has, at the guide wall, a temperature lower than the temperature without the guide wall and gas layer. As a result, the thermomechanical stresses in the valve body are lower. The valve body 7 therefore undergoes smaller deformations, and the fastenings of the two half-shells 25, 27 to one another are stressed less.

Because all of the parts of the heat recovery device on the side of the inlet 9 are stressed less from a thermomechanical perspective, it is possible to reduce the thickness of the materials, and therefore to reduce the thermal inertia of the device.

Furthermore, because the stray losses are reduced in the presence of the guide wall, the sealing between the shutter in the short-circuit position and the valve body is less critical. It becomes possible to use a less costly material for the seal, procuring a lower sealing level. Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A heat recovery device for an exhaust line, the heat recovery device comprising:
   a valve body having at least one exhaust gas inlet and at least one exhaust gas outlet, the valve body inwardly defining a direct flow path for exhaust gases from the exhaust gas inlet to the exhaust gas outlet;
   a heat exchanger to exchange heat between the exhaust gases and a heat transfer fluid, the heat exchanger comprising a flow path for the exhaust gases and a flow path for the heat transfer fluid, the flow path for the exhaust gases having upstream and downstream ends respectively emerging through inlet and outlet surfaces of the valve body, respectively situated relatively closer to the exhaust gas inlet and relatively closer to the exhaust gas outlet along the direct flow path;
   a shutter arranged in the valve body and movable relative to the valve body at least between a heat exchange position, in which the shutter closes off a cutoff section of the direct flow path and forces the exhaust gases to flow from the exhaust gas inlet to the exhaust gas outlet through the heat exchanger along the flow path, and a short-circuit position, in which the shutter frees said cutoff section of the direct flow path and closes off the outlet surface, the shutter forcing the exhaust gases to flow from the exhaust gas inlet to the exhaust gas outlet along the direct flow path, the cutoff section being situated between the inlet surface and the outlet surface along the direct flow path; and
   wherein the heat recovery device comprises a guide wall arranged in the direct flow path in front of the inlet surface and arranged to guide the exhaust gases from the exhaust gas inlet toward the cutoff section away from the inlet surface when the shutter is in the short-circuit position, and defining at least one opening to allow the exhaust gases to flow to the inlet when the shutter is in the heat exchange position.

2. The device according to claim 1, wherein the guide wall is a tube that inwardly defines a conduit for the exhaust gases, the conduit extending from an upstream opening situated upstream from the inlet surface to a downstream opening situated downstream from the inlet surface.

3. The device according to claim 1, wherein the device comprises, in the cutoff section, at least one obstacle able to hinder flow of the exhaust gases, and wherein a downstream end part of the guide wall is arranged to deflect the exhaust gases away from the at least one obstacle.

4. The device according to claim 3, wherein the at least one obstacle comprises a frame defining a sealing face for the shutter in the heat exchange position.

5. The device according to claim 4, wherein the frame has an inner edge defining a central opening for the passage of the exhaust gases, and wherein a downstream end part of the guide wall is connected to the inner edge.

6. The device according to claim 1, wherein the guide wall is delimited in an upstream direction by an upstream edge sealably connected to an inner surface of the direct flow path.

7. The device according to claim 1, wherein the guide wall is separated from the valve body by a gas layer, at least in front of the inlet surface, the direct flow path being at a first pressure at the outlet surface when the shutter is in the short-circuit position, and the gas layer being at a second pressure lower than the first pressure when the shutter is in the short-circuit position.

8. The device according to claim 1, wherein the heat exchanger comprises an enclosure inwardly delimiting the flow path for the heat transfer fluid and pressed against the valve body, the enclosure having at least one opening closed by a wall of the valve body in which the inlet surface is arranged.

9. The device according to claim 1, wherein the shutter has a seal bearing against the valve body in the short-circuit position, the seal being made from a metal knit.

10. The device according to claim 1, wherein the direct flow path offers, along the guide wall, a first passage section for the exhaust gases, the flow path offering, along the outlet surface, a second passage section for the exhaust gases, larger than the first passage section.

11. A vehicle exhaust line comprising:
   a heat recovery device including a valve body having at least one exhaust gas inlet and at least one exhaust gas outlet, the valve body inwardly defining a direct flow path for exhaust gases from the exhaust gas inlet to the exhaust gas outlet;
   a heat exchanger to exchange het between the exhaust gases and a heat transfer fluid, the heat exchanger comprising a flow path for the exhaust gases and a flow path for the heat transfer fluid, the flow path for the exhaust gases having upstream and downstream ends respectively emerging through inlet and outlet surface of the valve body, respectively situated relatively closer to the exhaust gas inlet and relatively closer to the exhaust gas outlet along the direct flow path;

a shutter arranged in the valve body and movable relative to the valve body at least between a heat exchange position, in which the shutter closes off a cutoff section of the direct flow path and forces the exhaust gases to flow from the exhaust gas inlet to the exhaust gas outlet through the heat exchanger along the flow path, and a short-circuit position, in which the shutter frees said cutoff section of the direct flow path and closes off the outlet surface, the shutter forcing the exhaust gases to flow from the exhaust gas inlet to the exhaust gas outlet along the direct flow path, the cutoff section being situated between the inlet surface and the outlet surface along the direct flow path; and wherein the heat recovery device comprises a guide wall arranged in the direct flow path in front of the inlet surface and arranged to guide the exhaust gases from the exhaust gas inlet toward the cutoff section away from the inlet surface when the shutter is in the short-circuit position, and defining at least one opening to allow the exhaust gases to flow to the surface when the shutter is in the heat exchange position.

12. The device according to claim 1, wherein the heat exchanger is located outside of the valve body.

13. The device according to claim 1, wherein the shutter is located outside the guide wall when in the short-circuit position.

14. The device according to claim 1, wherein the inlet surface includes a plurality of inlet holes and the heat exchanger includes a plurality of tubes inwardly defining the exhaust gas flow path, each tube having one upstream end and one downstream end, and wherein each tube is connected by the upstream end to one of the inlet holes.

15. The device according to claim 1, wherein the at least one opening of the guide wall is pierced in an area of the guide wall facing the inlet surface of the valve body and parallel to the inlet surface.

16. The device according to claim 1, wherein a downstream end part of the guide wall is located upstream of the cutoff section along the direct flow path.

17. The device according to claim 1, wherein the guide wall is inserted radially between a central axis of the valve body and the inlet surface.

18. The device according to claim 17, wherein the guide wall is separated from the valve body by a gas layer that is positioned radially between an outer surface of the guide wall and the inlet surface.

19. The vehicle exhaust line according to claim 11, wherein the shutter is located outside the guide wall when in the short-circuit position.

20. The vehicle exhaust line according to claim 11, wherein the guide wall is inserted radially between a central axis of the valve body and the inlet surface.

21. The device according to claim 20, wherein the guide wall is separated from the valve body by a gas layer that is positioned radially between an outer surface of the guide wall and the inlet surface.

* * * * *